United States Patent
Kitagawa

(10) Patent No.: US 12,539,656 B2
(45) Date of Patent: Feb. 3, 2026

(54) METHOD FOR PRODUCING POLY-4-METHYL-1-PENTENE WITH LOWER MOLECULAR WEIGHT

(71) Applicant: TOYOBO MC CORPORATION, Osaka (JP)

(72) Inventor: Yoshiyuki Kitagawa, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 98 days.

(21) Appl. No.: 18/700,001

(22) PCT Filed: Oct. 11, 2022

(86) PCT No.: PCT/JP2022/037835
§ 371 (c)(1),
(2) Date: Apr. 10, 2024

(87) PCT Pub. No.: WO2023/063298
PCT Pub. Date: Apr. 20, 2023

(65) Prior Publication Data
US 2024/0335996 A1    Oct. 10, 2024

(30) Foreign Application Priority Data
Oct. 13, 2021    (JP) .................................. 2021-168148

(51) Int. Cl.
*B29C 48/00*    (2019.01)
*B29C 48/16*    (2019.01)
*B29K 23/00*    (2006.01)

(52) U.S. Cl.
CPC ............ *B29C 48/023* (2019.02); *B29C 48/16* (2019.02); *B29C 2948/92695* (2019.02); *B29K 2023/12* (2013.01); *B29K 2023/18* (2013.01)

(58) Field of Classification Search
CPC .................. B29C 48/023; B29C 48/16; B29C 2948/92695
See application file for complete search history.

(56) References Cited

U.S. PATENT DOCUMENTS

| | | |
|---|---|---|
| 3,121,070 A | 2/1964 | Coover, Jr. et al. |
| 4,874,399 A | 10/1989 | Reed et al. |
| 5,051,331 A | 9/1991 | Sakashita |
| 5,496,507 A | 3/1996 | Angadjivand et al. |
| 6,119,691 A | 9/2000 | Angadjivand et al. |
| 6,783,574 B1 | 8/2004 | Angadjivand et al. |
| 2013/0052464 A1 | 2/2013 | Kawabe et al. |

FOREIGN PATENT DOCUMENTS

| | | |
|---|---|---|
| GB | 1009079 A | 11/1965 |
| JP | S59-031717 A | 2/1984 |
| JP | S60-177052 A | 9/1985 |
| JP | H02-275962 A | 11/1990 |
| JP | 2634224 B2 | 7/1997 |
| JP | 3735687 B2 | 1/2006 |
| JP | 2011-140593 A | 7/2011 |
| JP | 5798113 B2 | 10/2015 |

OTHER PUBLICATIONS

Yasufuku et al., "The Fundamental Properties and Thermal Decomposition Characteristics of Poly-4-methylpentene-1," *Kobunshi Ronbunshu*, 42(2): 121-128 (1985).
Japan Patent Office, International Search Report in International Patent Application No. PCT/JP2022/037835 (Dec. 6, 2022).
European Patent Office, Extended European Search Report in European Patent Application No. 22880993.5 (Oct. 27, 2025).

*Primary Examiner* — James Sanders
(74) *Attorney, Agent, or Firm* — Leydig, Voit & Mayer, Ltd.

(57) ABSTRACT

According to the method of the present invention, poly-4-methyl-1-pentene with a lower molecular weight can be easily and safely produced by mixing poly-4-methyl-1-pentene and another type of polyolefin (I) and conducting melt-stirring at a temperature equal to or higher than the melting points of both the poly-4-methyl-1-pentene and the polyolefin (I).

6 Claims, No Drawings

METHOD FOR PRODUCING POLY-4-METHYL-1-PENTENE WITH LOWER MOLECULAR WEIGHT

TECHNICAL FIELD

The present invention relates to a method for producing poly-4-methyl-1-pentene with a lower molecular weight.

BACKGROUND ART

Conventionally, fluorine resins and fluorine compounds having a perfluoro group have been used because of favorable characteristics thereof such as water repellency, oil repellency, non-adhesiveness, releasability, and electrical insulation properties. However, the use of fluorine compounds represented by perfluorochemicals has become more difficult in recent years due to chemical restrictions and raw material recycling.

The promising alternative substance such fluorine compounds is poly-4-methyl-1-pentene. However, controlling the molecular weights of olefin polymers is challenging. To obtain a low molecular weight substance that is made from poly-4-methyl-1-pentene and that is useful as a modifying additive, it is necessary to either thermally decompose or undergo radical decomposition of the high molecular weight polymer through methods such as irradiation with radiation or the addition of substances like peroxides (for example, Patent Literature 1).

Citation List

Patent Literature

[PTL 1] JP-B2-5798113

SUMMARY OF THE INVENTION

Problems to be Solved by the Invention

However, the pyrolysis tends to embrittle the polymer itself and requires a special high-temperature heating device. In addition, the radical decomposition through application of radioactive rays or addition of a peroxide poses problems in terms of safety in work and generation of odors due to residues and oxidation products.

Thus, the present invention has been made in view of the above problems, and an object of the present invention is to provide a novel method for easily and safely producing poly-4-methyl-1-pentene with a lower molecular weight.

Solution to the Problems

As a result of diligent studies, the present inventor has completed the present invention by finding out that the above problems can be solved by the following methods. The present invention has the following features.
(1) A method for producing poly-4-methyl-1-pentene with a lower molecular weight, the method comprising: mixing poly-4-methyl-1-pentene and another type of polyolefin (I); and conducting melt-stirring at a temperature equal to or higher than the melting points of both the poly-4-methyl-1-pentene and the polyolefin (I).
(2) The method according to (1), wherein the polyolefin (I) has a tertiary carbon.
(3) The method according to (1) or (2), wherein the polyolefin (I) is polypropylene.
(4) The method according to any one of (1) to (3), wherein the mixing includes further adding a hindered phenol compound.

Advantageous Effects of the Invention

According to the method of the present invention, poly-4-methyl-1-pentene with a lower molecular weight can be easily and safely produced.

DESCRIPTION OF EMBODIMENTS

Hereinafter, the present invention will be specifically described. However, the present invention is not limited to the following description and can also be carried out with appropriate modifications being made within the scope of the gist described above and below, and any of these modifications are included in the technical scope of the present invention.

The present invention relates to a method for reducing the molecular weight of poly-4-methyl-1-pentene. The method involves reducing the molecular weight of poly-4-methyl-1-pentene obtained through a polymerization method in advance. There are no specific limitations if the desired properties are achieved, and the molar fraction of a composition derived from 4-methyl-1-pentene in the polymer is preferably 80 mol % or higher, more preferably 85 mol % or higher, further preferably 90 mol % or higher, and particularly preferably 95 mol % or higher. Within the above range, characteristics of the poly-4-methyl-1-pentene can be effectively expressed.

The polymer may include various olefins as copolymerized components other than the 4-methyl-1-pentene. Examples of the olefins may include ethylene, propylene, and α-olefins having 4 to 20 carbon atoms. More specifically, examples of the olefins may include propylene, 1-decene, 1-dodecene, 1-tetradecene, 1-hexadecene, 1-octadecene, and 1-eicosene. The polymer preferably comprises one or more types of these olefins. To improve flame resistance and rigidity, a halogenated olefin and an alicyclic olefin are also preferably used.

The method of the present invention comprises mixing poly-4-methyl-1-pentene aimed at reducing molecular weight and another type of polyolefin (I): and conducting melt-stirring at a temperature equal to or higher than the melting points of both the poly-4-methyl-1-pentene and the polyolefin (I) to produce poly-4-methyl-1-pentene with a lower molecular weight. The present invention is a method that allows the effective production of poly-4-methyl-1-pentene with a lower molecular weight without the need for peroxides and even during the addition of a primary antioxidant. The method is advantageous in terms of suppression of an oxygen-containing functional group.

The polyolefin (I) preferably has a lower viscosity than the poly-4-methyl-1-pentene aimed at reducing molecular weight. Although the detailed mechanism is unclear, it is believed that the molecular weight of the poly-4-methyl-1-pentene having been melted progressively becomes lower owing to factors such as physically generated radicals or shear force of the low-viscosity polyolefin flowing at a high speed. This advantageous effect is shown by the fact indicated in examples and comparative examples described later at the same shear rate in a twin-screw extruder. When the poly-4-methyl-1-pentene aimed at reducing molecular weight was fed alone, substantially no change in the molecular weight was observed. Meanwhile, when the poly-4-methyl-1-pentene aimed at reducing molecular weight and the polyolefin (I) having a lower viscosity than the poly-4-methyl-1-pentene were mixed and stirred, the molecular weight of the poly-4-methyl-1-pentene became obviously lower and reached a molecular weight equivalent to that of the polyolefin added at the same time.

The polyolefin (I) used in the present invention may be in the form of any of liquid, wax, and resin. As described above, the difference in velocity with the heated polyolefin (I) accelerates molecular chain cleavage of the poly-4-methyl-1-pentene. The polyolefin (I) may be used alone or in combination of 2 or more to impart a plasticizing effect. A final molecular weight can be set according to the viscosity of the polyolefin (I) to be mixed. In the case of molecular weight reduction, the polyolefin (I) preferably has non-compatibility, and a larger difference in melt viscosity. Meanwhile, in the case of mixing in a dispersed manner, the polyolefin (I) preferably has a smaller difference in viscosity. Thus, that fundamentally differs in concept from the present invention.

Examples of the polyolefin (I) used in the present invention may include any of polyolefins having various characteristics depending on the final purpose, and the polyolefin (I) preferably has a tertiary carbon. The use of a polymer with a tertiary carbon allows the polymer itself to serve as a radical source and effectively suppress cross-linking reactions. Moreover, the molecular interaction between the side chains enables the effective reduction of the molecular weight of the poly-4-methyl-1-pentene. Examples of the polymers with high density of tertiary carbons preferably includes polypropylene or poly-4-methyl-1-pentene that are made low in viscosity through the molecular weight reduction or copolymerization modification.

In the present invention, it is also preferable that the resins are not compatible with each other, and it is particularly preferable to mix the poly-4-methyl-1-pentene and the polypropylene. The polypropylene to be used preferably has a lower viscosity than the poly-4-methyl-1-pentene aimed at reducing molecular weight. Specifically, the polypropylene has a melt flow rate (MFR, per 10 minutes, 230° C., at a load of 2.16 kg) of preferably 20 to 3000 g, more preferably 100 to 2500 g, and further preferably 500 to 2000 g. Excessively large value of the MFR may result in difficulty to handle the resulting mixture. Excessively small value of the MFR may lead to insufficiency in the effect of lowering the viscosity.

In the present invention, a mixing ratio in a mass ratio between the poly-4-methyl-1-pentene aimed at reducing molecular weight and the polyolefin can be within a range of 99:1 to 1:99 according to required properties and device properties. The ratio is more preferably 5:95 to 95:5, further preferably 10:90 to 90:10, and particularly preferably 20:80 to 80:20. If the mixing ratio of the poly-4-methyl-1-pentene is too low, the amount of the resulting lower-molecular-weight substance will be small. If the mixing ratio is too high, the processability and the effect of molecular weight reduction may be impaired.

In the present invention, poly-4-methyl-1-pentene aimed at reducing molecular weight, and the polyolefin are mixed, melt-stirring is conducted at a temperature equal to or higher than the melting points of both the poly-4-methyl-1-pentene and the polyolefin (I), and shear force is applied in the melted state. The method of applying shear force is not particularly limited, and examples of the method include a batch method using a heating container and a stirring function; and a continuous processing method using a single-screw extruder or a multi-screw extruder and a continuous kneader, or by passing through a thin tube or a porous body. Obviously, in each of these methods, it is recommended to design the shapes of a stirring blade, a screw, and a flow path to be suitable for shearing. That is, it is recommended to use a compounding or a masterbatch processing machine that is different from a molding processing machine. For a single-screw extruder, a mixing screw with a shape different from a full flight shape is preferable. For a multi-screw extruder, a reverse block or a kneading disc for shear mixing is also preferable. Among them, the use of a multi-screw extruder is more preferable to achieve a balance between high shear rate and uniform mixing properties.

In the present invention, a shearing condition that is preferably employed is not particularly limited as long as a desired lower-molecular-weight substance is obtained. For example, the circumferential speed of the screw (screw rotation speed×screw outer circumferential length) is preferably 1 to 500 cm/s, more preferably 5 to 300 cm/s, further preferably 10 to 200 cm/s, and particularly preferably 15 to 150 cm/s. Excessively low circumferential speed may lead to insufficient molecular weight reduction. Excessively high circumferential speed may cause feed failure and air mixing, resulting in difficulty forming pellets due to oxidation or degradation and strand breakage.

In the melt-stirring process of the present invention, the temperature only has to be equal to or higher than the melting points of the poly-4-methyl-1-pentene and the polyolefin (I). The resin temperature is preferably 100 to 450° C., more preferably 130 to 350° C., further preferably 150 to 300° C., and particularly preferably 200 to 270° C. Excessively high temperatures may cause oxidation and degradation. Excessively low temperatures may result in insufficient molecular weight reduction.

In the present invention, when using the poly-4-methyl-1-pentene with a lower molecular weight as a functional material, it is preferable to add various additives such as antioxidants, light resisting agents, electrification improvers, antistatic agents, pigments, in antibacterial agents, fillers, lubricants. These additives may be added during mixing or after mixing.

The poly-4-methyl-1-pentene with a lower molecular weight produced by the present invention can be used as is, i.e., as a mixture with the polyolefin. Alternatively, through separation therebetween, for example, by utilizing the difference in melting point, the poly-4-methyl-1-pentene can be used alone or used for various purposes such as a resin modifier or a coating agent.

EXAMPLES

Although examples and comparative examples of the present invention will be described below, the present invention is not limited to the examples. In the examples and the comparative examples, measurement and evaluation were conducted under the following conditions and methods.

Molecular Weight and Evaluation of Molecular Weight
    Evaluation method: high-temperature GPC in which molecular weights were obtained by conversion based on a polystyrene standard
    Solvent: o-dichlorobenzene
    Temperature: 140° C.
    Detector: refractive index detector
    Flow rate: 1 ml/min
    Separation column: two columns (each of which was GMHHR-H (20) HT manufactured by TOSOH CORPORATION) connected in series
    Dissolution concentration: 1.5 mg/ml

Comparative Example 1

A resin having yet to be melt-extruded was subjected to measurement through high-temperature GPC. Each of poly-4-methyl-1-pentene (DX820, design values: a melting point of 233° C. and a melt flow rate of 180 g/10 min (at a temperature of 260° C. and at a load of 5 kg), manufactured by Mitsui Chemicals, Inc.) and polypropylene (HP461Y, design values: a melting point of 161° C. and a melt flow rate of 1300 g/10 min (at a temperature of 230° C. and at a load of 2.16 kg), manufactured by PolyMirae Co., Ltd.), was dissolved in o-dichlorobenzene, and the resultant solution was used as a sample. As a result of the measurement, the HP461Y had a peak molecular weight of 114000, a width at half maximum of 119 seconds, and a peak asymmetry coefficient of 1.38, and the DX820 had a peak molecular weight of 228000, a width at half maximum of 143 seconds, and a peak asymmetry coefficient of 3.53.

Example 1

Using a twin-screw extruder with a 30 mm diameter, poly-4-methyl-1-pentene (DX820, manufactured by Mitsui Chemicals, Inc.) and polypropylene (HP461Y, the polyolefin (I), manufactured by PolyMirae Co., Ltd.) were supplied at a mass ratio of 4:6 and melt-extruded under conditions that the resin temperature at an outlet was 250° C. and the rotation speed was 200 rotations/min. The resulting resin mixture was dissolved in o-dichlorobenzene, and the resulting solution was subjected to molecular weight distribution analysis. Only one main peak was detected, the peak molecular weight was 129000, the width at half maximum was 143 seconds, and the asymmetry coefficient was 1.38. Thus, the molecular weight of the poly-4-methyl-1-pentene was clearly found to have become lower.

Example 2

The same procedure as that in example 1 was conducted except that 1% by mass of hindered phenol additive Irganox (registered trademark) 1010 was mixed with the mixture of poly-4-methyl-1-pentene (DX820, manufactured by Mitsui Chemicals, Inc.) and polypropylene (HP461Y, manufactured by PolyMirae Co., Ltd.) in a mass ratio of 4:6. Only one main peak was detected, the peak molecular weight was 141090, the width at half maximum was 143 seconds, and the asymmetry coefficient was 1.38. Thus, the molecular weight of the poly-4-methyl-1-pentene was clearly found to have become lower.

Comparative Example 2

The same procedure as that in example 1 was conducted except that only polypropylene (HP461Y, manufactured by PolyMirae Co., Ltd.) and no polyolefin (I) was used. Only one main peak was detected, the peak molecular weight was 112000, the width at half maximum was 122 seconds, and the asymmetry coefficient was 1.41. Thus, there was only a slight difference between the molecular weight before and after the extrusion.

Comparative Example 3

The same procedure as that in example 1 was conducted except that only poly-4-methyl-1-pentene (DX820, manufactured by Mitsui Chemicals, Inc.) and no polyolefin (I) was used. Only one main peak was detected, the peak molecular weight was 206000, the width at half maximum was 149 seconds, and the asymmetry coefficient was 1.76. Thus, there was only a slight difference between the molecular weight before and after the extrusion.

Comparative Example 4

To investigate the peak shape of the resins without melt extrusion, poly-4-methyl-1-pentene (DX820, manufactured by Mitsui Chemicals, Inc.) and polypropylene (HP461Y, manufactured by PolyMirae Co., Ltd.), which were not subjected to melt extrusion, were each weighed and mixed in a mass ratio of 4:6, to prepare a solution with a total concentration of 1.5 mg/ml. Measurement was then conducted through high-temperature GPC without melt extrusion. The peak molecular weight was 112000, the width at half maximum was 175 seconds, the peak asymmetry coefficient was 4.52, and the peak shape was simply an overlay of the peaks obtained individually from each resin.

According to examples 1 and 2 and comparative examples 1 to 4, it has been found that poly-4-methyl-1-pentene with a lower molecular weight can be produced by mixing poly-4-methyl-1-pentene and the polyolefin (I) and conducting melt-stirring at a temperature equal to or higher than the melting points of both the poly-4-methyl-1-pentene and the polyolefin (I). Furthermore, it has been found that a molecular weight distribution similar to that of the mixed polyolefin can be obtained.

INDUSTRIAL APPLICABILITY

According to the method of the present invention, poly-4-methyl-1-pentene with a lower molecular weight can be easily and safely produced. The poly-4-methyl-1-pentene with a lower molecular weight produced by the present invention can be used alone or as a non-fluorine-based modifier for another resin and be applicable to provide properties such as water repellency, oil repellency, non-adhesiveness, releasability, and electrical insulation.

The invention claimed is:

1. A method for producing poly-4-methyl-1-pentene with a lower molecular weight, the method comprising:
   mixing poly-4-methyl-1-pentene and another type of polyolefin (I); and
   conducting melt-stirring at a temperature equal to or higher than the melting points of both the poly-4-methyl-1-pentene and the polyolefin (I).

2. The method according to claim 1, wherein the polyolefin (I) has a tertiary carbon.

3. The method according to claim 1, wherein the polyolefin (I) is polypropylene.

4. The method according to claim 1, wherein the mixing includes further adding a hindered phenol compound.

5. The method according to claim 1, wherein the polyolefin (I) has a lower viscosity than the poly-4-methyl-1-pentene.

6. The method according to claim 1, wherein the polyolefin (I) and the poly-4-methyl-1-pentene are not compatible with each other.

* * * * *